(12) United States Patent
Yu et al.

(10) Patent No.: US 10,769,487 B2
(45) Date of Patent: Sep. 8, 2020

(54) METHOD AND DEVICE FOR EXTRACTING INFORMATION FROM PIE CHART

(71) Applicant: ABC FINTECH CO., LTD., Beijing (CN)

(72) Inventors: Zhou Yu, Beijing (CN); Yongzhi Yang, Beijing (CN); Zhanqiang Zhang, Beijing (CN)

(73) Assignee: ABC FINTECH CO, LTD., Beijing (CN)

( * ) Notice: Subject to any disclaimer, the term of this patent is extended or adjusted under 35 U.S.C. 154(b) by 231 days.

(21) Appl. No.: 15/955,621

(22) Filed: Apr. 17, 2018

(65) Prior Publication Data
US 2019/0266434 A1 Aug. 29, 2019

(30) Foreign Application Priority Data
Feb. 26, 2018 (CN) .......................... 2018 1 0159637

(51) Int. Cl.
| | |
|---|---|
| *G06K 9/00* | (2006.01) |
| *G06K 9/46* | (2006.01) |
| *G06T 7/62* | (2017.01) |
| *G06T 7/90* | (2017.01) |
| *G06K 9/62* | (2006.01) |
| *G06T 11/20* | (2006.01) |

(52) U.S. Cl.
CPC .......... *G06K 9/469* (2013.01); *G06K 9/6256* (2013.01); *G06T 7/62* (2017.01); *G06T 7/90* (2017.01); *G06T 11/206* (2013.01); *G06K 2209/01* (2013.01); *G06T 2207/20072* (2013.01)

(58) Field of Classification Search
CPC .. G06K 2209/01; G06K 9/00; G06K 9/00456; G06K 9/469; G06K 9/6256; G06K 9/6267; G06T 11/206; G06T 2207/20072; G06T 7/62; G06T 7/90
See application file for complete search history.

(56) References Cited

U.S. PATENT DOCUMENTS

| | | | |
|---|---|---|---|
| 2015/0278219 A1* | 10/2015 | Phipps | G06F 16/951 707/711 |
| 2018/0068198 A1* | 3/2018 | Savvides | G06K 9/3233 |
| 2018/0204360 A1* | 7/2018 | Bekas | G06K 9/6277 |
| 2018/0336405 A1* | 11/2018 | Messina | G06K 9/342 |

* cited by examiner

*Primary Examiner* — Tom Y Lu
(74) *Attorney, Agent, or Firm* — Morgan, Lewis & Bockius LLP

(57) ABSTRACT

The present application relates to a method and a device for extracting information from a pie chart. The method comprises the following steps: detecting each element in a pie chart to be processed and position information thereof, wherein the elements comprise text elements and legend elements; performing text recognition on the detected text elements and legend elements to obtain text information corresponding to the text elements and legend texts included in the legend elements respectively; and obtaining sector information and legend information according to each detected element and position information thereof and the legend texts, and enabling the sector information to correspond to the legend information one by one, wherein the sector information comprises a sector color and a proportion of the sector in the pie chart, and the legend information comprises a legend color and a corresponding legend text thereof.

14 Claims, 8 Drawing Sheets

S101. detecting each element in a pie chart to be processed and position information thereof, the elements including text elements and legend elements S102. performing text recognition on the detected text elements and legend elements to obtain text information corresponding to the text elements and legend texts included in the legend elements respectively S103. obtaining sector information and legend information according to each detected element and position information thereof and the legend texts, and enabling the sector information to correspond to the legend information one by one S101. detecting each element in a pie chart to be processed and position information thereof, the elements including text elements and legend elements S102. performing text recognition on the detected text elements and legend elements to obtain text information corresponding to the text elements and legend texts included in the legend elements respectively S103. obtaining sector information and legend information according to each detected element and position information thereof and the legend texts, and enabling the sector information to correspond to the legend information one by one

Fig. 1

Gross Profit Ratio

METHOD AND DEVICE FOR EXTRACTING INFORMATION FROM PIE CHART

CROSS-REFERENCE TO RELATED APPLICATION

This application claims the benefit of Chinese Patent Application No. 201810159637.3, filed Feb. 26, 2018 with State Intellectual Property Office, the People's Republic of China, the entire content of which is incorporated by reference herein.

TECHNICAL FIELD

The present application relates to the technical field of data processing, and particularly, relates to a method and a device for extracting information from a pie chart.

BACKGROUND

The pie chart is one type of charts, and mainly consists of sectors, sector description texts (percentages or numbers), legend texts, legends and a title. At present, information is extracted from the pie chart completely by adopting an image processing technology, and the validity of an image processing method completely depends on the image quality of an image to be processed. If the image quality is high, the accuracy of information extraction is high, otherwise, the accuracy is low. In other words, the accuracy of information extraction from the pie chart cannot be guaranteed at present.

SUMMARY

The objective of the present application is to provide a method and a device for extracting information from a pie chart, which extract information from the pie chart by adopting a deep learning method or a combination of deep learning and image processing.

In order to fulfill the above objective, the embodiments of the present application provide the following technical solutions:

In one aspect, an embodiment of the present application provides a method for extracting information from a pie chart, including the following steps:

detecting each element in a pie chart to be processed and position information thereof, the elements including text elements and legend elements;

performing text recognition on the detected text elements and legend elements to obtain text information corresponding to the text elements and legend texts included in the legend elements respectively; and obtaining sector information and legend information according to each detected element and position information thereof and the legend texts, and enabling the sector information to correspond to the legend information one by one, wherein the sector information includes a sector color and a proportion of the sector in the pie chart, and the legend information includes a legend color and a corresponding legend text thereof.

In the above method, if the legends in the pie chart to be processed are arranged from top to bottom and/or from left to right, and the sectors correspond to the legends one by one clockwise or anticlockwise, the step of obtaining sector information and legend information according to each detected element and position information thereof and the legend text and enabling the sector information to correspond to the legend information one by one includes:

obtaining each piece of legend information according to the color and legend text included in each detected legend element;

calculating the proportion of each sector in the pie chart to be processed;

extracting sector information of at least one sector which has a larger area, and enabling the sector information to correspond to the corresponding legend information; and enabling the sector information of the remaining sectors arranged clockwise or anticlockwise to correspond to the legends arranged from top to bottom and/or from left to right one by one.

In another aspect, an embodiment of the present application provides a device for extracting information from a pie chart, including:

an element detection module, configured to detect each element in a pie chart to be processed and position information thereof, the elements including text elements and legend elements;

a text recognition module, configured to perform text recognition on the detected text elements and legend elements to obtain text information corresponding to the text elements and legend texts included in the legend elements respectively; and a sector-legend correspondence module, configured to obtain sector information and legend information according to each detected element and position information thereof and the legend texts, and enable the sector information to correspond to the legend information one by one, wherein the sector information includes a sector color and a proportion of the sector in the pie chart, and the legend information includes a legend color and a corresponding legend text thereof.

In another aspect, an embodiment of the present application provides a computer readable storage medium including computer readable instructions, wherein a processor executes the operations in the method of the embodiment of the present application when the computer readable instructions are executed.

In another aspect, an embodiment of the present application provides an electronic equipment, including: a memory, configured to store program instructions; and a processor, connected with the memory, and configured to execute the program instructions in the memory to implement the steps of the method in the embodiment of the present application.

Compared with the prior art, the present application has the advantages that the method and the device of the present application extract the information from the pie chart by means of deep learning, so that the accuracy of information extraction from the pie chart can be improved, and the adaptability of the method is also enhanced; and the method and the device can be applied to various pie charts with different image qualities, and provide a simple and effective solution for information extraction from the pie charts. In addition, the image is converted into structured data by extracting the information from the pie chart, thus providing a guarantee for later data analysis and processing.

BRIEF DESCRIPTION OF THE DRAWINGS

In order to illustrate the technical solutions in the embodiments of the present application more clearly, a brief introduction will be made below to the drawings required in the embodiments. It should be understood that the drawings below only show some embodiments of the present application and should not be regarded as limit to the scope, and other relevant drawings could be obtained based on these drawings by those of ordinary skill in the art without any creative efforts.

FIG. 1 is a flow diagram of a method for extracting information from a pie chart according to some embodiments of the present application.

DETAILED DESCRIPTION OF THE EMBODIMENTS

Figure 2:
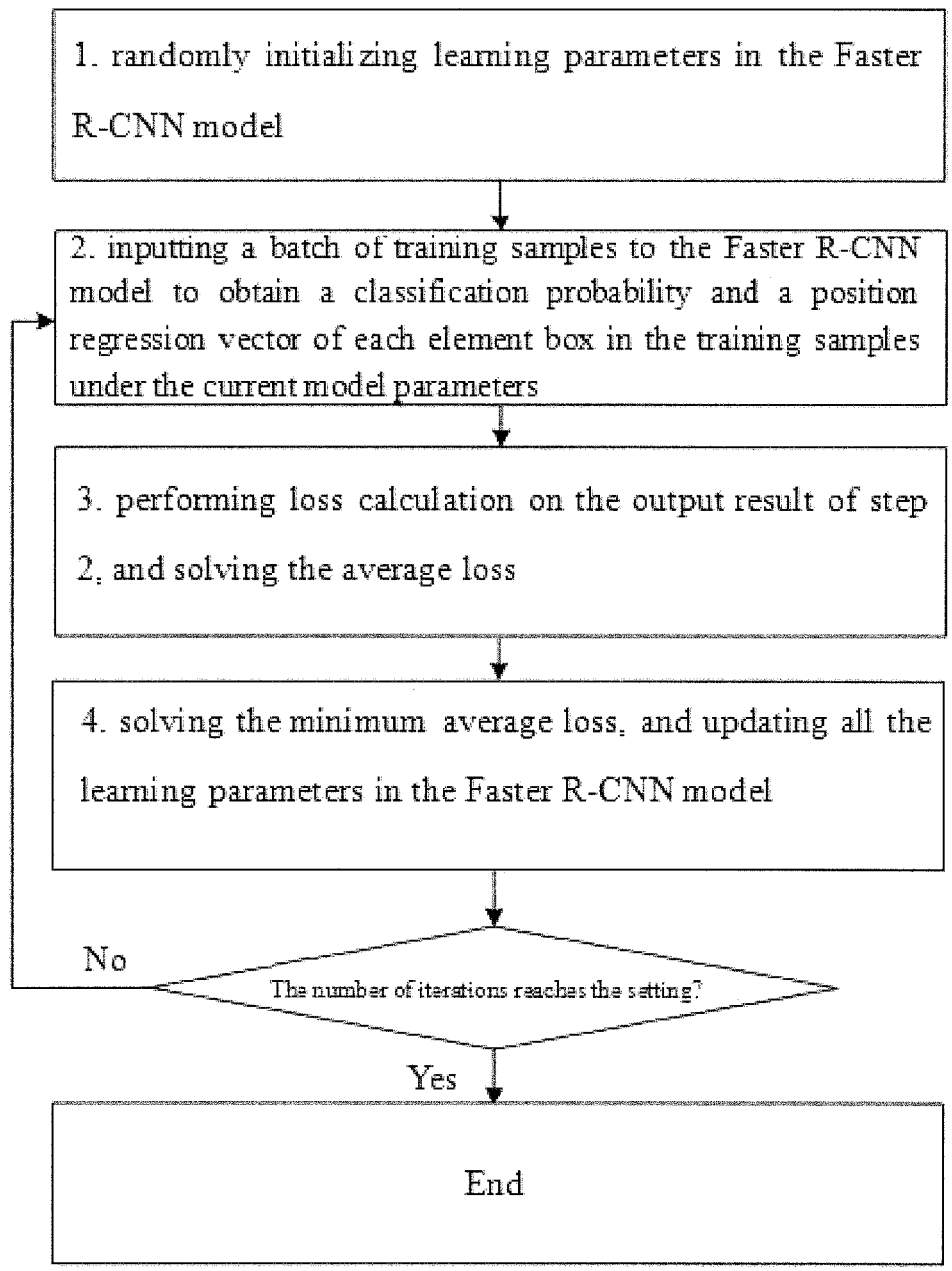
FIG. 2 is a training flow diagram of a Faster R-CNN model according to some embodiments of the present application.

A clear and complete description will be made to the technical solutions in the embodiments of the present application below in combination with the drawings in the embodiments of the present application. Apparently, the embodiments described are only part of the embodiments of the present application, not all of them. Generally, the components of the embodiments of the present application described and shown in the drawings here may be arranged and designed with various different configurations. Therefore, the detailed description of the embodiments of the present application provided in the drawings below is not intended to limit the protection scope of the present application, but only indicates the selected embodiments of the present application. All other embodiments obtained by those skilled in the art without creative efforts based on the embodiments of the present application shall fall within the protection scope of the present application.

Figure 5:
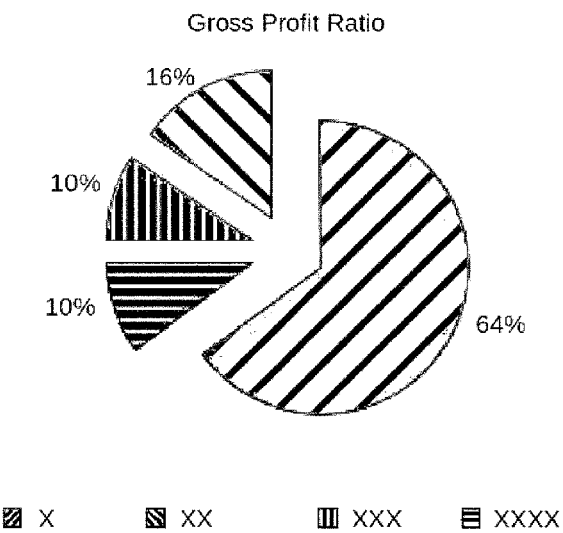
FIG. 5 is an original pie chart according to some embodiments of the present application.
Figure 6:
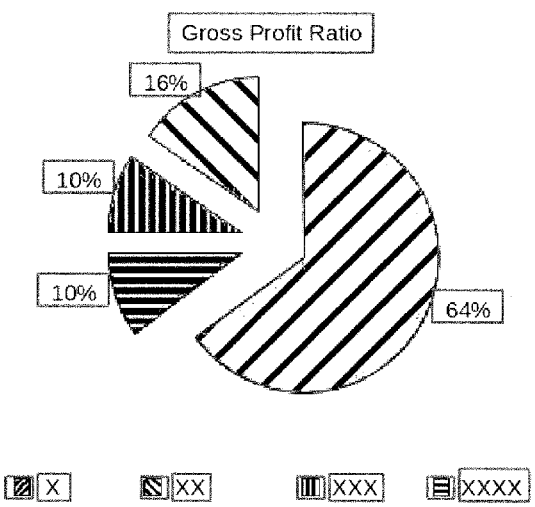
FIG. 6 is a state diagram of FIG. 5 after element detection according to some embodiments of the present application.

Referring to FIG. 1, a method for extracting information from a pie chart according to some embodiments includes the following steps:

S101. detect each element in a pie chart to be processed and position information thereof by adopting a target detection method based on a Faster R-CNN model, for example, that is, input the pie chart to be processed to the pre-trained Faster R-CNN model to obtain position coordinates and a distribution area of each element, wherein the elements include text elements and legend elements. As shown in FIGS. 5 and 6, FIG. 5 is an original pie chart, and FIG. 6 is a state diagram after Faster R-CNN model detection. Bounding rectangles of all elements extracted after the Faster R-CNN model detection may be referred to as element boxes, and the element boxes indicate distribution areas of the elements.

The Faster R-CNN model is mainly used for detecting targets in natural scenes, such as vehicles, people, animals, etc. However, the inventor found in the studies, when the model is applied to element detection of the pie chart, a good detection effect can be achieved, and the judgment on element types and the position regression are very accurate. The sample for training the Faster R-CNN model includes a training set and a test set. The test set is derived from manual marking. Columns, coordinate axes, texts and legends are marked in the image. The coordinate axes can be subdivided into a horizontal coordinate axis and a vertical coordinate axis. Referring to FIG. 2, in this embodiment, the process of training the Faster R-CNN model is as follows:

step 1. randomly initializing learning parameters in the Faster R-CNN model;

step 2. inputting a batch (corresponding to mini-batch below) of training samples to the Faster R-CNN model to obtain a predicted classification probability $p_i$ and a predicted bounding box coordinate vector $t_i$ of the $i^{th}$ element box in the training samples under the current model parameters;

step 3. performing loss calculation on the output result in step 2 by adopting the following formula, and solving the average loss $\overline{L}$ of all the element boxes in the batch of training samples, $$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*),$$

in which $L(\{p_i\}, \{t_i\})$ is the loss of the $i^{th}$ element box, $N_{cls}$ is the value of mini-batch, generally 256, $N_{reg}$ is the number of anchor positions, generally approximately 2400, $\lambda$ is weight, usually set to 10, then the cls and reg items are also equal weights, $$\sum_i L_{cls}(p_i, p_i^*)$$

is the logarithmic loss of a target (i.e., an element box) and a non-target,
$L_{cls}(p_i,p_i^*) = -\log[p_i^* p_i + (1-p_i^*)(1 p_i)]$, the actual label probability Pi* is 1 if Pi is positive, Pi* is 0 if Pi is negative, $$\sum_i p_i^* L_{reg}(t_i, t_i^*)$$

is a regression loss function, $L_{reg}(t_i,t_i^*)=R(t_i-t_i^*)$, wherein R is a defined robust loss function (smooth L1), $$smooth_{L_1}(x) = \begin{cases} 0.5x^2 & \text{if } |x| < 1 \\ |x| - 0.5 & \text{otherwise} \end{cases},$$

ti is a vector indicating 4 parameterized coordinates of the predicted bounding box, and ti* is the coordinate vector of the actual bounding box;

step 4. solving the minimum $\overline{L}$, and updating all the learning parameters in the Faster R-CNN model; and step 5. repeatedly executing steps 2 to 4 until reaching a set number of iterations. The number of iterations may be set empirically, for example, 100,000 times, but the set number of iterations at least needs to guarantee that the minimum $\overline{L}$ in step 4 no longer changes.

Through deep learning and the use of the Faster R-CNN model for target detection, each element in the pie chart can be detected, and the method can adapt to a pie chart with lower quality and does not depend on the quality of an image.

It should be noted that, in addition to the above target detection method of the Faster R-CNN model, target detection methods of other models, e.g., an R-CNN model, a FastR-CNN model and the like, can also be adopted for element detection.

S102. perform text recognition on the detected text elements and legend elements by adopting an OCR recognition algorithm, for example, to obtain text information corresponding to the text elements and legend texts included in the legend elements respectively. That is, the text information in each text element box is recognized through an Attention-ocr model, for example, sector description texts 64%, 16%, 10% and the like in FIG. 5; and for another example, the title "Gross Profit Ratio" in FIG. 5. The OCR recognition is a mature existing technology, and is not further described herein.

S103. obtain sector information and legend information according to each detected element and position information thereof and the legend texts, and enable the sector information to correspond to the legend information one by one, wherein the sector information includes a sector color and a proportion of the sector in the pie chart, and the legend information includes a legend color and a corresponding legend text thereof.

During specific implementation, step 103 of obtaining sector information and legend information according to each detected element and position information thereof and the legend texts and enabling the sector information to correspond to the legend information one by one may be implemented in multiple manners.

For example, in an implementable solution, in the case that the pie chart to be processed does not include the proportion information of each sector in the pie chart, step S103 above may include: firstly, obtaining each piece of legend information according to the color and legend text included in each detected legend element; secondly, recognizing each sector in the pie chart by using an image processing algorithm, e.g., an edge detection method; thirdly, matching each sector with the corresponding legend information via color matching in an RGB color space; and finally, calculating the included angle of each sector to obtain a proportion of each sector in the pie chart, for example, if the included angle of the sector is 36 degrees, the sector accounts for 10%, and the sector corresponds to the corresponding legend information.

By means of the above implementation, in the case that the image quality is good and the proportion of each sector in the pie chart is relatively large, the extracted information has higher accuracy, but for the case that the image quality is poor or the proportions of some sectors in the pie chart is relatively small, the accuracy of information matching is relatively low.

Figure 3:
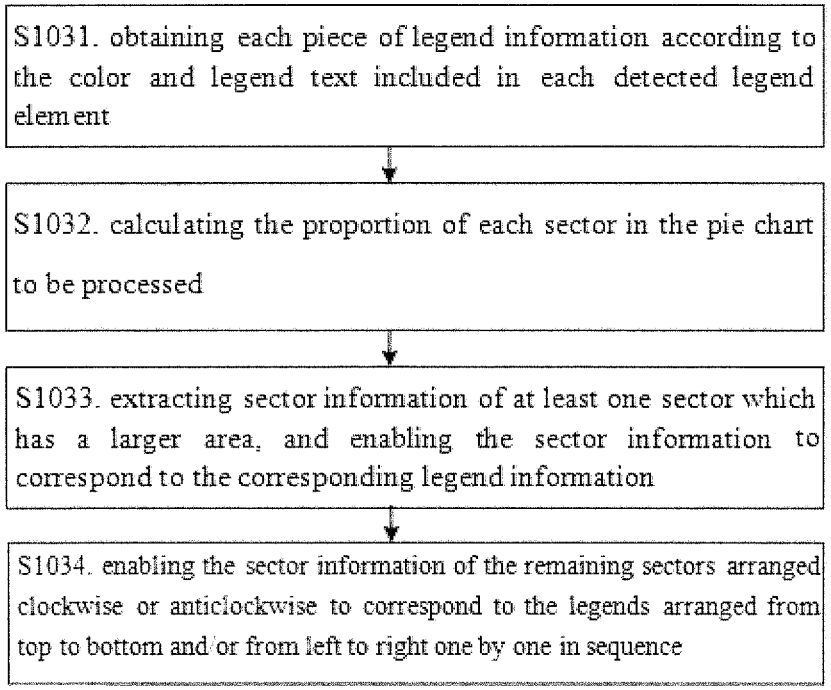
FIG. 3 is a flow diagram of achieving correspondence between legend information and sector description information according to some embodiments of the present application.

Therefore, in another more preferred embodiment, for a pie chart in which the legends are arranged top to bottom and/or from left to right and the respective sectors correspond to the legend information one by one clockwise or anticlockwise, as shown in FIG. 3, step S103 above may be implemented in the following manner: S1031. obtaining each piece of legend information according to the color and legend text included in each detected legend element;

S1032. calculating the proportion of each sector in the pie chart to be processed;

S1033. extracting sector information of at least one sector (e.g., one to three sectors) which has a larger area, and enabling the sector information to correspond to the corresponding legend information; and S1034. enabling the sector information of the remaining sectors arranged clockwise or anticlockwise to correspond to the legends arranged from top to bottom and/or from left to right one by one in sequence.

Generally, the pie chart is drawn according to a certain drawing rule. For example, the legends are arranged from top to bottom or from left to right. When the quantity of the legends is large, the legends are arranged in an array manner from left to right and from top to bottom. For another example, the respective sectors correspond to the legends one by one clockwise (or anticlockwise in the future). In the embodiment shown in FIG. 3, some sectors and legends are matched first, and then the remaining sectors are matched with the corresponding legends according to a known drawing rule, so that the accuracy of information extraction can be enhanced, and the influence of small sector area or poor image quality on the accuracy of information extraction is avoided. In particular, one or more sectors with larger area are selected to be preferentially matched with the legend information. Because the sector area is large, the sector information (sector color and proportion in the pie chart) of the sector is more accurately extracted.

In the embodiment shown in FIG. 3, step S1032 of calculating the proportion of each sector in the pie chart to be processed may be implemented in different manners for different cases.

For example, in the case that the pie chart to be processed does not include sector description texts, or the pie chart to be processed includes sector description texts, but the sector description texts do not include information about the proportions of the sectors in the pie chart (the proportions may be percentage numbers, e.g., as shown in FIG. 5, or numbers without percentages, e.g., 64% in FIG. 5 may also be written as 64, and the ratio of a single number to the sum of all numbers can be converted to the percentage in the pie chart), the proportion of each sector in the pie chart is obtained by calculating an angle of each sector occupying in the pie chart by means of an image processing algorithm after each sector area is recognized.

For another example, in the case that the pie chart to be processed includes sector description texts and each sector description text includes a proportion of each sector in the pie chart, the step of calculating the proportion of each sector in the pie chart includes:

extracting sector description texts from the text information recognized in step S102; and enabling each sector in the pie chart to be processed to correspond to the corresponding sector description text one by one to obtain the proportion of the sector in the pie chart.

Generally, each sector description text is distributed around the center of the pie chart, and may be in the area of each sector or outside the area of the sector. However, the sector description text corresponds to the corresponding sector. For example, the sector description text is located in the middle of the corresponding sector, that is, the sector description text also corresponds to the legend information one by one clockwise or anticlockwise. Thus, enabling each sector in the pie chart to be processed to correspond to the corresponding sector description text one by one may include the following steps:

counting the number of all pixels of the same color (i.e., the same RGB value) except for the background color in the pie chart to be processed in an RGB color space (if the area of a sector is larger, the number of pixels in the sector area is larger), and arranging the sectors in a descending order, one color representing one sector;

selecting at least one color arranged in the front, calculating the center of gravity of the sector represented by the color according to the distribution area (not necessarily an accurate area of the corresponding sector, a rough area also does not affect the accuracy of information extraction) of the color pixels, and connecting the center of the pie chart with the center of gravity of the sector by taking the center of the pie chart as an origin to obtain the direction of the sector;

taking the center of the pie chart as the origin, connecting the center of the pie chart with the center of gravity of each sector description text to obtain the direction of each sector description text;

matching the direction of the sector with the direction of each sector description text, and enabling the sector description text with minimum angle difference to correspond to the sector; and enabling the remaining sector description texts arranged clockwise or anticlockwise to correspond to the sectors arranged clockwise or anticlockwise one by one in sequence.

In this way, part of the sectors with larger area are preferentially matched with the corresponding sector description texts, and then the remaining sectors are matched with the corresponding sector description texts one by one in sequence according to a specific direction, so compared with the method of recognizing each sector by an image processing method and then performing one-to-one correspondence, this method can improve the accuracy of information correspondence.

In an implementable solution shown in FIG. 3, step S1033 of extracting sector information of at least one sector with larger area and enabling the sector information to correspond to the corresponding legend information in the embodiment may include the following steps:

counting the number of all pixels of the same color (the same RGB value) except the background color in the pie chart to be processed in the RGB color space, and arranging the sectors in a descending order, one color representing one sector;

selecting at least one color arranged in the front, and matching the color with the legend color to complete the matching of the extracted color (the represented sector) and the corresponding legend information; and determining the proportion of the sector represented by the color corresponding to the legend information in the pie chart to complete the correspondence between the sector information of at least one sector with larger area and the corresponding legend information.

For the case that the foregoing sector description texts also correspond to the legend information one by one clockwise or anticlockwise, when the step of enabling each sector in the pie chart to be processed to correspond to the corresponding sector description text one by one is executed, the process of extracting at least one color arranged in the front is also executed. For the two steps S1032 and S1033, the above execution processes may be the same or different, that is to say, the number and type of the selected colors arranged in the front may be the same or different, but the colors selected in step S1033 need to include the color selected in step S1032.

Figure 4:
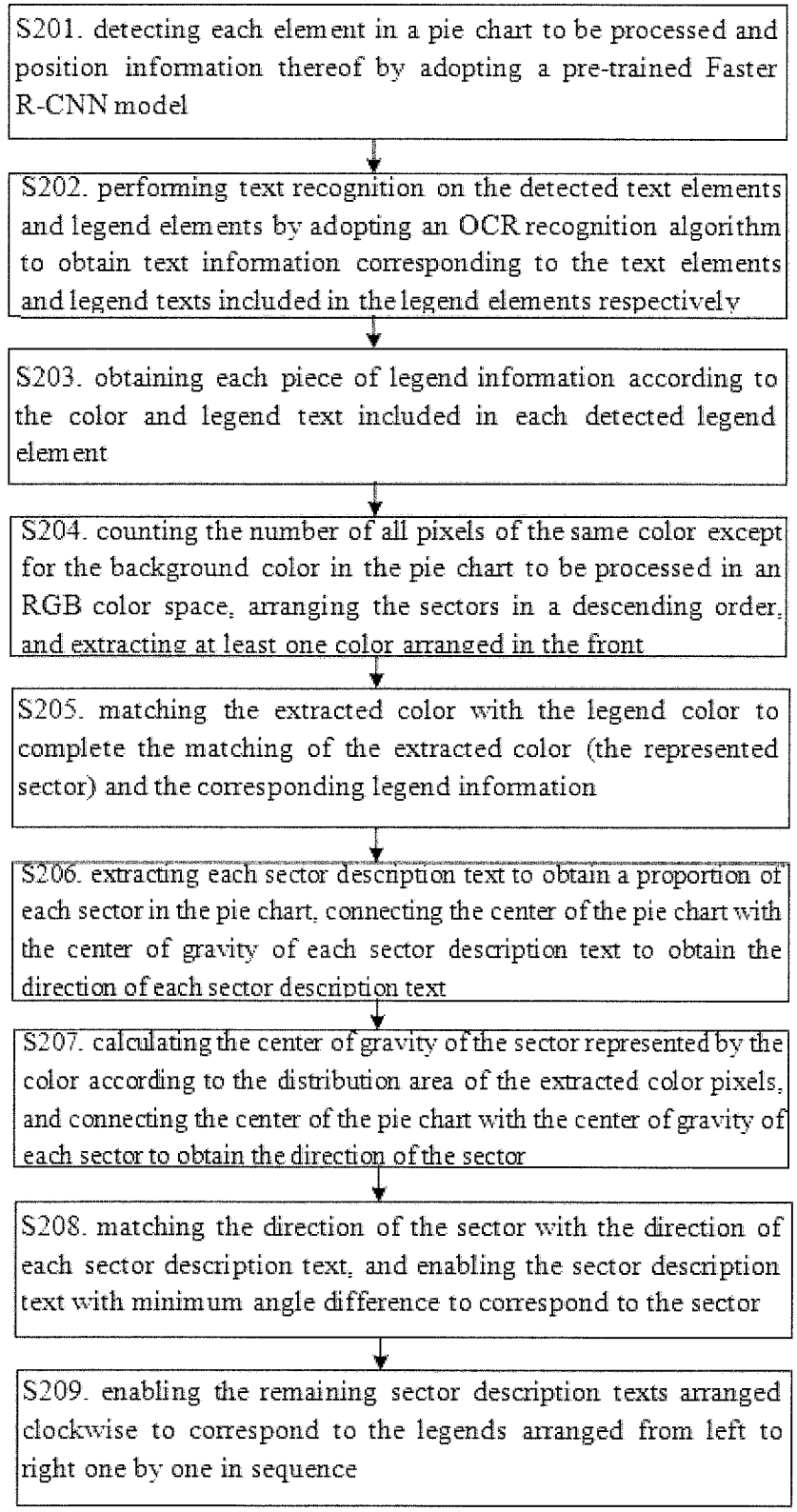
FIG. 4 is a flow diagram of extracting information from a pie chart shown in FIG. 5.

Referring to FIG. 4, the information extraction method of the present application is illustrated in more detail with the pie chart shown in FIG. 5. The method shown in FIG. 4 includes the following steps:

S201. detect each element in a pie chart to be processed and position information thereof by adopting a pre-trained Faster R-CNN model.

S202. perform text recognition on the detected text elements and legend elements by adopting an OCR recognition algorithm to obtain text information corresponding to the text elements and legend texts included in the legend elements respectively.

S203. obtain each piece of legend information according to the color and legend text included in each detected legend element.

In this step, in the RGB space, the color of each legend element is recognized first, and then the legend color is matched with the legend text to obtain each piece of legend information. A piece of legend information includes a legend color and a corresponding legend text. Generally, the legend text is next to the corresponding legend color block, the legend color block and the legend text are located on the same line, the legend text is located on the left or right of the legend color block, and they are arranged in a manner of "legend color block, legend text, legend color block, legend text . . . " or "legend text, legend color block, legend text, legend color block . . . ", so each piece of legend information can be obtained easily.

S204. count the number of all pixels of the same color (i.e., the same RGB value) except the background color (in a pie chart, the color distribution area of the background color is maximum, so the background color is excluded in the manner of removing the color with the largest number of pixels) in the pie chart to be processed in an RGB color space (if the area of a sector is larger, the number of pixels in the sector is larger), arrange the sectors in a descending order, and extract at least one color arranged in the front, wherein one color represents one sector. For example, as shown in FIG. 6, black (representing the deepest color in the figure) is extracted, and the sector of the color occupies the largest proportion in the pie chart, i.e., 64%.

The number of all the pixels of the same color except the background color in the pie chart here can be understood in two ways: one is that the pixels include pixels of a sector area and pixels of a legend area corresponding to the sector, and the other one is that the pixels only include pixels of a sector area, but neither of the two understandings affects the calculation of the sector area, since the legend area has few pixels which are negligible for the sector area. Therefore, it can be understood here that one color represents one sector, and the number of all the pixels in the sector indicates the area of the sector.

The first several colors instead of all the colors are selected here, because some sectors are very small in area (for example, the sectors only occupy 1%), or the image quality is poor, and too much interference is brought in the color extraction of the sector areas, resulting in that the sector information cannot be accurately extracted. According to the drawing rule of the pie chart, the pie chart is drawn clockwise in one-to-one correspondence to legends in the sequence from top to bottom or from left to right. In theory, if only one sector has corresponded to one legend, and the other ones will correspond to each other according to the sequence of the legends. The purpose of extracting the first several colors with larger area is to avoid mismatch of legends and sector information due to the similar colors of the legends for the sake of matching robustness. In other words, by extracting the sectors of the several colors with a large number of pixels, the accuracy of matching the legends with the sector information can be improved, the matching is not limited by the image quality, and the applicability and flexibility of information extraction from the pie chart can be enhanced.

S205. match the extracted color with the legend color to complete the matching of the extracted color (the represented sector) and the corresponding legend information, e.g., to complete the matching of the sector represented by the black and the cement industry.

Here, as an example of an implementable manner of matching the extracted color with the legend color, the RGB value of each legend color and the RGB value of the color are respectively obtained in the RGB space, and Euclidean distance calculation is performed on the RGB value of the extracted color and the RGB value of each legend color, wherein the legend color with the shortest distance is the legend color corresponding to (matching) the color, that is, the correspondence between the sector represented by the color and the legend information is completed.

S206. extract each sector description text from the recognized text information to obtain a proportion of each sector in the pie chart and position coordinates of each sector description text, and with the center of the pie chart as the origin, connect the center of the pie chart with the center of gravity of each sector description text to obtain the direction of each sector description text.

According to the prior knowledge, if the pie chart has sector description texts, the sector description texts are distributed according to certain rule, that is, the sector description texts are distributed around the center of the pie chart. Generally, the sector description texts include percentages or numbers. Thus, all the sector description texts can be extracted from the recognized text information, and the proportions of the sectors can be known from the sector description texts. For example, the sector description text of the cement industry is 64%, and then the proportion 64% of the sector can be extracted.

The pie chart is specifically shown in two situations: one is that all the sectors are spliced together to form a circle, and the other one is that the sectors are separated from each other. For the situation that the pie chart is a circle, the center of the pie chart (also understood as a circle) can be determined through image circle detection. If the pie chart is non-circular, as shown in FIG. 5, the centers of the sector description texts are calculated according to the position coordinates of the sector description texts around the sectors (also applicable to the situation that the pie chart is a circle) as the center of the pie chart. After the center of the pie chart is found, taking the center of the pie chart as an origin, a position coordinate point of the rectangular text element box of each sector description text is connected with the origin to calculate the direction of the text element of the sector description text, i.e., angle information (an included angle between the connecting line and the defined standard line, wherein the standard line may be the positive x axis) of the text element relative to the center of the pie chart. Taking FIG. 6 as an example, the center position o of the pie chart can be estimated from the x and y position coordinates of the sector description texts (i.e., "64%", "10%", "10%" and "16%"). Taking the point o as an origin, the direction angles from the point o to the sector description texts are calculated and are respectively 230 degrees, 36 degrees, 36 degrees and 58 degrees, and then "64%", "10%", "10%" and "16%" are arranged clockwise around the center point o according to 230 degrees, 36 degrees, 36 degrees and 58 degrees.

S207. calculate the center of gravity of the sector represented by the color according to the distribution area (not necessarily an accurate area of the corresponding sector, a rough area also does not affect the accuracy of information extraction) of the extracted color pixels, and connect the center of the pie chart with the center of gravity of each sector by taking the center of the pie chart as an origin to obtain the direction of the sector.

S208. match the direction of the sector with the direction of each sector description text, and enable the sector description text with minimum angle difference to correspond to the sector, e.g., complete correspondence between the sector represented by the black and 64%, and then complete matching among the cement industry, the sector represented by the black and 64%, i.e., complete matching of the sector information and the legend information.

By comparing the direction angles of the sectors with the direction angles of the sector description texts to realize the correspondence between the sectors and the sectors description texts, the problem of erroneous correspondence caused by a plurality of sectors with the same area or mismatch between the actual area of each sector and the corresponding sector description text can be avoided, and the accuracy of correspondence between the sectors and the sector description texts is improved.

Figure 7:
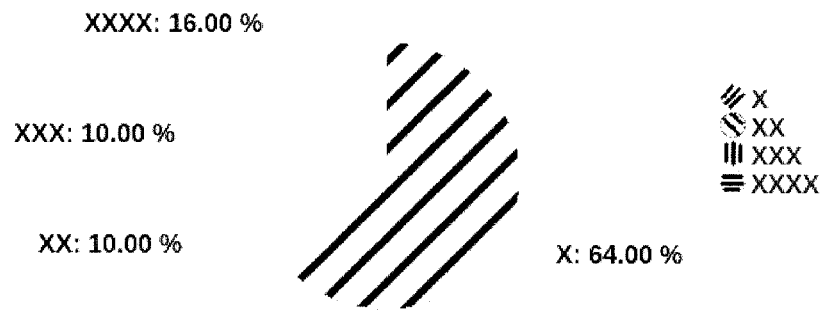
FIG. 7 is a state diagram of completed correspondence between a piece of legend information and a piece of sector information according to some embodiments of the present application.

S209. enable the remaining sector description texts arranged clockwise to correspond to the legend information arranged from left to right one by one in sequence, wherein one sector description text corresponds to one sector, thus, correspondence between the sector description texts and the legend information is completed, that is, matching of all the sector information and the legend information in the pie chart is completed. For example, after the correspondence between the cement industry and 64% is completed, "10%", "10%" and "16%" arranged clockwise are matched one by one with "real estate industry", "medical industry" and "other" arranged in sequence from left to right to obtain a one-to-one corresponding relation shown in FIG. 7.

In addition to the sector description texts, the pie chart may have a title. Therefore, the above-mentioned information extraction method further includes a step of determining a title text and a title position of the pie chart to be processed.

The title of the legends is usually distributed at the top or the bottom of the image, so the title can be determined according to the position coordinates of the text element. The title of the image is determined from the remaining unprocessed text according to the position information of the text. If there is no unprocessed text, the title is blank. As shown in FIG. 6, after the analysis of the previous steps, the text "Gross Profit Ratio" is not processed, the position coordinates of the text element "Gross Profit Ratio" are compared with those of the sector description text to determine that the text element is located at the top of the image, thus, the "Gross Profit Ratio" can be determined as the title.

After the above processing, if there is an unprocessed text element, the text element is determined as other description text.

Figure 8:
FIG. 8 is a pie chart reconstructed after all the legend information corresponds to the sector information according to some embodiments of the present application.

After the above processing, the legend information has corresponded to the sector description information one by one, and the proportion of each sector, the title information (if any) of the pie chart and other description text (if any) have been extracted, that is, all the information in the pie chart has been extracted. In a further perfect solution, the extracted information can be structured, and the obtained structured data is visualized with HIGHCHARTS, wherein the HIGHCHARTS is a convenient and rapid HTML5 interactive icon library, which can be used for simply and rapidly adding interactive icons in a web site or a web application. The reconstructed pie chart is as shown in FIG. 8.

Figure 9:
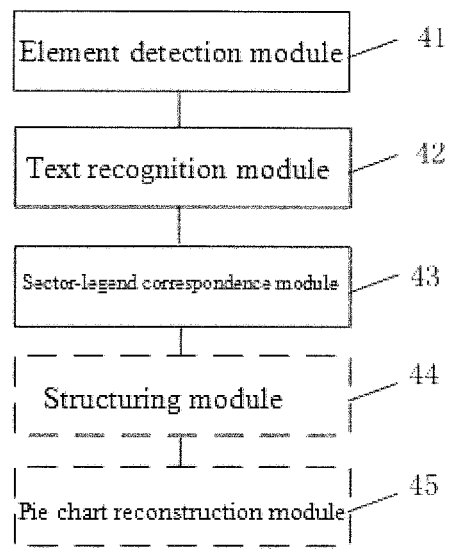
FIG. 9 is a functional module diagram of a device for extracting information from a pie chart according to some embodiments of the present application.
Figure 10:
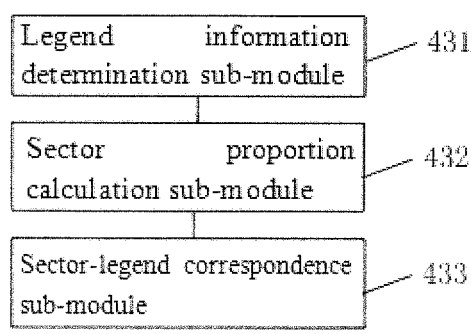
FIG. 10 is a functional module diagram of a sector-legend correspondence module according to some embodiments of the present application.

Based on the same inventive concept as the above method, an embodiment of the present application further provides a device for extracting information from a pie chart. As shown in FIG. 9, the device for extracting information from a pie chart includes an element detection module 41, a text recognition module 42 and a sector-legend correspondence module 43.

The element detection module 41 is configured to detect each element in a pie chart to be processed and position information thereof by adopting a deep learning target detection method, for example, wherein the elements include text elements and legend elements.

The text recognition module 42 is configured to perform text recognition on the detected text elements to obtain text information of the text elements, and to perform text recognition on the detected legend elements to obtain legend texts included in the legend elements.

The sector-legend matching module 43 is configured to obtain sector information and legend information according to each detected element and position information thereof and the legend text, and enable the sector information to correspond to the legend information one by one, wherein the sector information includes a sector color and a proportion of the sector in the pie chart, and the legend information includes a legend color and a corresponding legend text thereof.

In an optional solution, the information extraction device may further include a structuring module 44 and a pie chart reconstruction module 45, wherein, the structuring module 44 is configured to convert all the extracted element information of the pie chart to be processed and corresponding relations into structured data; and the pie chart reconstruction module 45 is configured to visually display the structured data to reconstruct a pie chart.

In an implementable solution, the element detection module 41 detects each element in the pie chart to be processed by using a target detection method of a Faster R-CNN model; the Faster R-CNN model is obtained by training via the following method:

step 1. randomly initializing learning parameters in the Faster R-CNN model;

step 2. inputting a batch of training samples to the Faster R-CNN model to obtain a predicted classification probability $p_i$ and a predicted bounding box coordinate vector $t_i$ of the $i^{th}$ element box in the training samples under the current model parameters;

step 3. performing loss calculation on the output result in step 2 by adopting the following formula, and solving the average loss $\overline{L}$ of all the element boxes in the batch of training samples, $$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*),$$

in which $L(\{p_i\},\{t_i\})$ is the loss of the $i^{th}$ element box, $N_{cls}$ the value of mini-batch, $N_{reg}$ is the number of anchor positions, $\lambda$ is weight, $$\sum_i L_{cls}(p_i, p_i^*)$$

is the logarithmic loss of a target and a non-target, and $$\sum_i p_i^* L_{reg}(t_i, t_i^*)$$

is a regression loss function;

step 4. solving the minimum $\overline{L}$, and updating all the learning parameters in the Faster R-CNN model; and step 5. circularly executing steps 2 to 4 until reaching a set number of iterations.

In an implementable solution, the sector-legend matching module 43 includes the following sub-modules:

a legend information determination sub-module 431, configured to obtain each piece of legend information according to the color and legend text included in each detected legend element;

a sector proportion calculation sub-module 432, configured to calculate the proportion of each sector in the pie chart to be processed; and a sector-legend correspondence sub-module 433, configured to extract the sector information of at least one sector with larger area, and to match the sector information with the corresponding legend information; and to match the sector information of the remaining sectors arranged clockwise or anticlockwise with the legend information arranged from top to bottom and/or left to right one by one in sequence.

For the uninvolved part in the embodiment of the device for extracting information from a pie chart, e.g., different processing methods of the sector-legend correspondence sub-module 433 on different situations, reference may be made to the corresponding description in the foregoing embodiment of the method for extracting information from a pie chart.

Figure 11:
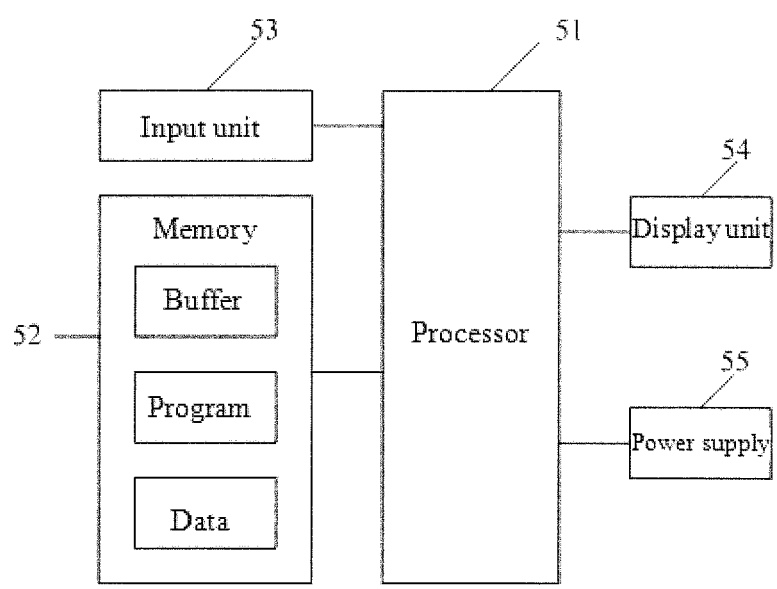
FIG. 11 is a structure block diagram of electronic equipment according to some embodiments of the present application.

As shown in FIG. 11, this embodiment simultaneously provides electronic equipment. The electronic equipment may include a processor 51 and a memory 52, wherein the memory 52 is coupled to the processor 51. It is worth noting that the figure is exemplary, and the structure may also be supplemented or replaced with other structure to realize data extraction, chart redrawing, communication or other functions.

As shown in FIG. 11, the electronic equipment may further include an input unit 53, a display unit 54 and a power supply 55. It is worth noting that the electronic equipment does not necessarily include all components shown in FIG. 11. Moreover, the electronic equipment may further include components not shown in FIG. 11, referring to the prior art.

The processor 51 is also referred to as a controller or an operation control sometimes, and may include a microprocessor or other processor device and/or logic device. The processor 51 receives an input and controls the operation of each component of the electronic equipment.

The memory 52, for example, may be one or more of a cache, a flash memory, a hard driver, a mobile medium, a volatile memory, a non-volatile memory and other proper device, and may store configuration information of the processor 51, instructions executed by the processor 51, recorded chart data and other information. The processor 51 may execute a program stored in the memory 52 to implement information storage or processing or the like. In one embodiment, the memory 52 further includes a buffer memory, i.e., a buffer, to store intermediate information.

The input unit 53, for example, is configured to provide a sample image or a pie chart to be processed for the processor

51. The display unit 54 is configured to display a pie chart after element detection, or information extracted from the pie chart, or a reconstructed pie chart. The display unit, for example, may be a liquid crystal display (LCD), but the present application is not limited thereto. The power supply 55 is configured to supply power to the electronic equipment.

An embodiment of the present application further provides a computer readable instruction, wherein when the instruction is executed in the electronic equipment, the program enables the electronic equipment to execute the operation steps included in the method of the present application.

An embodiment of the present application further provides a storage medium storing a computer readable instruction, wherein the computer readable instruction enables the electronic equipment to execute the operation steps included in the method of the present application.

It should be understood that, in various embodiments of the present application, the serial numbers of the above-mentioned steps do not mean the execution sequence. The execution sequence of the steps should be determined based on the functions and inherent logics thereof, but should not constitute any limitation to the implementation process of the embodiment of the present application.

Those of ordinary skill in the art may realize that the units and algorithm steps of each example described in combination with the embodiments disclosed in the present disclosure can be implemented by electronic hardware, computer software or the combination of computer software and the electronic hardware. In order to clearly describe the interchangeability of hardware and software, the composition and steps of each example are described generally above according to the functions. Whether these functions are executed by hardware or software depends on a specific application and design constraint conditions of the technical solution. Professionals can use different methods to implement the described functions for each specific application, but such implementation should not be considered as going beyond the scope of the present application.

Those skilled in the art may clearly understand that, for the purpose of convenience and briefness in description, for the specific working processes of the above-described systems, devices and units, reference could be made to the corresponding processes in the embodiments of the aforementioned methods, and description is not repeated here.

In the several embodiments provided in the present application, it should be understood that the disclosed systems, devices and methods may be realized in other modes. For example, the embodiments of the above-described devices are only exemplary, for example, the division of the units is only a logic function division, other division modes may be adopted in practice, e.g., a plurality of units or components may be combined or integrated in another system, or some characteristics may be omitted or not executed. In addition, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is to say, the components may be positioned at one place or may also be distributed on a plurality of network units. The objectives of the solutions of the embodiments of the present application may be fulfilled by selecting part of or all of the units according to actual needs.

When the integrated unit is realized in the form of a software functional unit and sold or used as an independent product, the integrated unit may be stored in a computer readable storage medium. Based on such an understanding, the technical solution of the present application substantially, or all or part of the present application making contribution to the prior art, or a part of the technical solution may be embodied in the form of a software product, and the computer software product is stored in a storage medium, which includes a plurality of instructions enabling computer equipment (which may be a personal computer, a server, or network equipment or the like) to execute all of or part of the steps in the methods of the embodiments of the present application. The aforementioned storage medium includes: various media capable of storing program codes, such as a U disk, a mobile hard disk, a read-only memory (ROM), a random access memory (RAM), a magnetic disk or optical disk.

The above description is the specific embodiments of the present application only, but the scope of the present application is not limited thereto, any skilled who is familiar with this art could readily think of variations or substitutions within the disclosed technical scope of the present application, and these variations or substitutions shall fall within the scope of the present application. Thus, the scope of the present application shall be subjected to the scope of the claims.

The invention claimed is:

1. A method for extracting information from a pie chart for display performed by an electronic device having a processor and memory for storing instruction to be executed by the processor, the method comprising:

detecting, by the electronic device, each element in a pie chart to be processed and position information thereof, the elements comprising text elements and legend elements;

performing, by the electronic device, text recognition on the detected text elements and legend elements to obtain text information corresponding to the text elements and legend texts included in the legend elements respectively; and obtaining, by the electronic device, sector information and legend information according to each detected element and position information thereof and the legend texts, and enabling, by the electronic device, the sector information to correspond to the legend information one by one, wherein the sector information comprises a sector color and a proportion of the sector in the pie chart, and the legend information comprises a legend color and a corresponding legend text thereof, wherein each element in the pie chart to be processed is detected by the electronic device by adopting a target detection method of a Faster R-CNN model and the Faster R-CNN model is pre-stored in the electronic device and derived via the following training method:

step 1. randomly initializing learning parameters in the Faster R-CNN model;

step 2. inputting a batch of training samples to the Faster R-CNN model to obtain a predicted classification probability $p_i$ and a predicted bounding box coordinate vector $t_i$ of the $i^{th}$ element box in the training samples under the current model parameters;

step 3. performing loss calculation on the output result in step 2 by adopting the following formula, and solving the average loss L̄ of all the element boxes in the batch of training samples, $$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*),$$

in which $L(\{p_i\},\{t_i\})$ is the loss of the $i^{th}$ element box, $N_{cls}$ is the value of mini-batch, $N_{reg}$ is the number of anchor positions, $\lambda$ is weight, $$\sum_i L_{cls}(p_i, p_i^*)$$

is the logarithmic loss of a target and a non-target, and $$\sum_i p_i^* L_{reg}(t_i, t_i^*)$$

is a regression loss function;
  step 4. solving the minimum L̄, and updating all the learning parameters in the Faster R-CNN model; and
  step 5. repeatedly executing steps 2 to 4 until reaching a set number of iterations.

2. The method according to claim 1, wherein the legends of the pie chart to be processed are arranged from top to bottom and/or from left to right, and the sectors correspond to the legends one by one clockwise or anticlockwise; and the step of obtaining sector information and legend information according to each detected element and position information thereof and the legend texts and enabling the sector information to correspond to the legend information one by one comprises:
  obtaining each piece of legend information according to the color and legend text included in each detected legend element;
  calculating the proportion of each sector in the pie chart to be processed;
  extracting sector information of at least one sector which has a larger area, and enabling the sector information to correspond to the corresponding legend information; and
  enabling the sector information of the remaining sectors arranged clockwise or anticlockwise to correspond to the legend information of the legends arranged from top to bottom and/or from left to right one by one in sequence.

3. The method according to claim 2, wherein the pie chart to be processed comprises sector description texts, each sector description text comprises the proportion of each sector in the pie chart, and the step of calculating the proportion of each sector in the pie chart comprises:
  extracting the sector description text from the recognized text information; and
  enabling each sector in the pie chart to be processed to correspond to the corresponding sector description text one by one to obtain the proportion of the sector in the pie chart.

4. The method according to claim 3, wherein the sector description texts in the pie chart to be processed correspond to the legends one by one clockwise or anticlockwise; and the step of enabling each sector to correspond to the corresponding sector description text one by one comprises:
  counting the number of all pixels of the same color except for the background color in the pie chart to be processed in an RGB color space, and arranging the sectors in a descending order, one color representing one sector;
  selecting at least one color arranged in the front, calculating the center of gravity of the sector represented by the color according to the distribution area of the color pixels, and connecting the center of the pie chart with the center of gravity of the sector by taking the center of the pie chart as an origin to obtain the direction of the sector;
  by taking the center of the pie chart as the origin, connecting the center of the pie chart with the center of gravity of each sector description text to obtain the direction of the sector description text;
  matching the direction of the sector with the direction of each sector description text, and enabling the sector description text with minimum angle difference to correspond to the sector; and
  enabling the remaining sector description texts arranged clockwise or anticlockwise to correspond to the sectors arranged clockwise or anticlockwise one by one in sequence.

5. The method according to claim 2, wherein the step of calculating the proportion of each sector in the pie chart comprises:
  calculating an angle of each sector occupying in the pie chart by using an image processing algorithm to obtain the proportion of the sector in the pie chart.

6. The method according to claim 2, wherein the step of extracting sector information of at least one sector which has a larger area and enabling the sector information to correspond to the corresponding legend information comprises:
  counting the number of all pixels of the same color except for the background color in the pie chart to be processed in the RGB color space, and arranging the sectors in a descending order, one color representing one sector;
  selecting at least one color arranged in the front, and matching the color with the legend color to complete the matching of the extracted color and the corresponding legend information; and
  determining the proportion of the sector represented by the color which has been corresponding to the legend information in the pie chart to complete the corresponding between the sector information of at least one sector which has a larger area and the corresponding legend information.

7. The method according to claim 4, wherein the pie chart is a circular pie chart, and the center of the pie chart is determined via an image circle detection method.

8. The method according to claim 4, wherein the pie chart is a non-circular pie chart and the center of the pie chart is determined via the following method:
  determining the center of gravity of each sector description text around the pie chart; and
  estimating the center of the pie chart according to the center of gravity of each sector description text.

9. The method according to claim 1, wherein the pie chart to be processed further comprises a title, the method further comprising a step of determining a title text and a title position of the pie chart to be processed.

10. The method according to claim 1, further comprising:
  converting all the extracted elements of the pie chart to be processed into structured data, and visually displaying the structured data to reconstruct the pie chart.

11. An electronic device for extracting information from a pie chart for display, comprising:
- a processor;
- memory; and
- a plurality of computer instructions stored in the memory, wherein the computer instructions, when executed by the processor, cause the electronic device to perform operations including:
  - detecting, by the electronic device, each element in a pie chart to be processed and position information thereof, the elements comprising text elements and legend elements;
  - performing, by the electronic device, text recognition on the detected text elements and legend elements to obtain text information corresponding to the text elements and legend texts included in the legend elements respectively; and
  - obtaining, by the electronic device, sector information and legend information according to each detected element and position information thereof and the legend texts, and enabling, by the electronic device, the sector information to correspond to the legend information one by one, wherein the sector information comprises a sector color and a proportion of the sector in the pie chart, and the legend information comprises a legend color and a corresponding legend text thereof,
- wherein each element in the pie chart to be processed is detected by the electronic device by adopting a target detection method of a Faster R-CNN model and the Faster R-CNN model is pre-stored in the electronic device and derived via the following training method:
- step 1. randomly initializing learning parameters in the Faster R-CNN model;
- step 2. inputting a batch of training samples to the Faster R-CNN model to obtain a predicted classification probability $p_i$ and a predicted bounding box coordinate vector $t_i$ of the $i^{th}$ element box in the training samples under the current model parameters;
- step 3. performing loss calculation on the output result in step 2 by adopting the following formula, and solving the average loss $L$ of all the element boxes in the batch of training samples, $$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*),$$

in which $L(\{p_i\},\{t_i\})$ is the loss of the $i^{th}$ element box, $N_{cls}$ is the value of mini-batch, $N_{reg}$ is the number of anchor positions, $\lambda$ is weight, $$\sum_i L_{cls}(p_i, p_i^*)$$

is the logarithmic loss of a target and a non-target, and $$\sum_i p_i^* L_{reg}(t_i, t_i^*)$$

is a regression loss function;
- step 4. solving the minimum $L$, and updating all the learning parameters in the Faster R-CNN model; and
- step 5. repeatedly executing steps 2 to 4 until reaching a set number of iterations.

12. The electronic device according to claim 11, wherein the legends of the pie chart to be processed are arranged from top to bottom and/or from left to right, and the sectors correspond to the legends one by one clockwise or anticlockwise; and the step of obtaining sector information and legend information according to each detected element and position information thereof and the legend texts and enabling the sector information to correspond to the legend information one by one comprises:
- obtaining each piece of legend information according to the color and legend text included in each detected legend element;
- calculating the proportion of each sector in the pie chart to be processed;
- extracting sector information of at least one sector which has a larger area, and enabling the sector information to correspond to the corresponding legend information; and
- enabling the sector information of the remaining sectors arranged clockwise or anticlockwise to correspond to the legend information of the legends arranged from top to bottom and/or from left to right one by one in sequence.

13. A non-transitory computer readable storage medium comprising computer readable instructions that, when executed by a processor of an electronic device having a display, cause the electronic device to perform operations including:
- detecting, by the electronic device, each element in a pie chart to be processed and position information thereof, the elements comprising text elements and legend elements;
- performing, by the electronic device, text recognition on the detected text elements and legend elements to obtain text information corresponding to the text elements and legend texts included in the legend elements respectively; and
- obtaining, by the electronic device, sector information and legend information according to each detected element and position information thereof and the legend texts, and enabling, by the electronic device, the sector information to correspond to the legend information one by one, wherein the sector information comprises a sector color and a proportion of the sector in the pie chart, and the legend information comprises a legend color and a corresponding legend text thereof,
- wherein each element in the pie chart to be processed is detected by the electronic device by adopting a target detection method of a Faster R-CNN model and the Faster R-CNN model is pre-stored in the electronic device and derived via the following training method:
- step 1. randomly initializing learning parameters in the Faster R-CNN model;
- step 2. inputting a batch of training samples to the Faster R-CNN model to obtain a predicted classification probability $p_i$ and a predicted bounding box coordinate vector $t_i$ of the $i^{th}$ element box in the training samples under the current model parameters;
- step 3. performing loss calculation on the output result in step 2 by adopting the following formula, and solving the average loss $L$ of all the element boxes in the batch of training samples, $$L(\{p_i\}, \{t_i\}) = \frac{1}{N_{cls}} \sum_i L_{cls}(p_i, p_i^*) + \lambda \frac{1}{N_{reg}} \sum_i p_i^* L_{reg}(t_i, t_i^*),$$

in which $L(\{p_i\},\{t_i\})$ is the loss of the $i^{th}$ element box, $N_{cls}$ is the value of mini-batch, $N_{reg}$ is the number of anchor positions, $\lambda$ is weight, $$\sum_i L_{cls}(p_i, p_i^*)$$

is the logarithmic loss of a target and a non-target, and $$\sum_i p_i^* L_{reg}(t_i, t_i^*)$$

is a regression loss function;
- step 4. solving the minimum $L$, and updating all the learning parameters in the Faster R-CNN model; and
- step 5. repeatedly executing steps 2 to 4 until reaching a set number of iterations.

14. The non-transitory computer readable storage medium according to claim 13, wherein the legends of the pie chart to be processed are arranged from top to bottom and/or from left to right, and the sectors correspond to the legends one by one clockwise or anticlockwise; and the step of obtaining sector information and legend information according to each detected element and position information thereof and the legend texts and enabling the sector information to correspond to the legend information one by one comprises:
- obtaining each piece of legend information according to the color and legend text included in each detected legend element;
- calculating the proportion of each sector in the pie chart to be processed;
- extracting sector information of at least one sector which has a larger area, and enabling the sector information to correspond to the corresponding legend information; and
- enabling the sector information of the remaining sectors arranged clockwise or anticlockwise to correspond to the legend information of the legends arranged from top to bottom and/or from left to right one by one in sequence.

* * * * *